US006308216B1

(12) United States Patent
Goldszmidt et al.

(10) Patent No.: US 6,308,216 B1
(45) Date of Patent: Oct. 23, 2001

(54) SERVICE REQUEST ROUTING USING QUALITY-OF-SERVICE DATA AND NETWORK RESOURCE INFORMATION

(75) Inventors: German Sergio Goldszmidt, Dobbs Ferry; John J. E. Turek, South Nyack, both of NY (US); Brian Jay Vetter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/970,410

(22) Filed: Nov. 14, 1997

(51) Int. Cl.[7] .............................. G06F 13/00; G06F 11/30

(52) U.S. Cl. ........................... 709/236; 709/224; 709/225

(58) Field of Search ..................................... 709/203, 224, 709/229, 223, 236, 238, 239, 240, 241, 242, 245, 225

(56) References Cited

U.S. PATENT DOCUMENTS 5,485,455 * 1/1996 Dobbins et al. .................... 370/255
5,712,979 * 1/1998 Graber et al. ........................ 709/224
5,727,129 * 3/1998 Barrett et al. .......................... 706/10
5,790,548 * 8/1998 Sistanizadeh et al. ............... 370/400
5,790,785 * 8/1998 Klug et al. ........................... 713/202
5,796,952 * 8/1998 Davis et al. .......................... 709/224
5,825,772 * 10/1998 Dobbins et al. .................... 370/396
5,878,233 * 3/1999 Schloss ................................ 709/225
5,892,917 * 4/1999 Myerson .............................. 709/224
5,903,559 * 5/1999 Acharya et al. ..................... 370/355
5,905,872 * 5/1999 DeSimone et al. .................. 709/245
5,918,017 * 6/1999 Attanasio et al. ................... 709/224
5,948,069 * 9/1999 Kitai et al. ........................... 709/240
5,968,176 * 10/1999 Nessett et al. ...................... 709/229
6,006,264 * 12/1999 Colby et al. ......................... 709/240
6,021,439 * 2/2000 Turek et al. ......................... 709/224
6,078,953 * 6/2000 Vaid et al. ........................... 709/223

OTHER PUBLICATIONS

Yan et al., Jun. 1996, "A distributed adaptive protocol providing real–time services on WDM–based LANs", Journal of Lightwave Technology, vol. 14, No. 6, pp. 1245–1254.*

Barziliai et al., May 1997, "Design and Implementation of an RSVP–based Quality of Service Architecture of Integrated Services Internet", Proceeding 17th International Conference on Distributed Computing Systems, pp. 543–551.*

Slew Leong Kan et al., Sep. 199, "ATM network multilevel control scheme", International Conference on Information—Communication and Signal Processing, vol. 2, pp. 621–625.*

* cited by examiner

*Primary Examiner*—Mark H. Rinehart
*Assistant Examiner*—Almari Romero
(74) *Attorney, Agent, or Firm*—Jeffrey S. LaBaw; Joseph R. Burwell; David Judson

(57) ABSTRACT

A routing apparatus is located at an outbound "edge" of an administrative domain or at an inbound "edge" of an ISP or other network facility. The apparatus, which is preferably implemented in software, includes a "dispatcher." The dispatcher has a database associated therewith in which information about a "current state" of the network or some resource therein is collected and maintained. The "current state" information is generally of two types: quality-of-service (Q-o-S) information associated with transactions involving a particular Web server, or more general network resource availability information. According to the invention, a routing "policy" is defined at the dispatcher using at least one routing rule having a condition and an action. As service requests arrive at the dispatcher, each of the requests is routed to a destination by testing the current state information against the condition.

21 Claims, 3 Drawing Sheets

100 COLLECT Q-o-S DATA
102 PROVIDE COLLECTED Q-o-S DATA TO APPARATUS
103 UPDATE RESOURCE AVAILABILITY DATA
104 NEW INBOUND REQUEST? NO / YES
106 RETRIEVE RELEVANT STATE INFORMATION
108 APPLY POLICY
110 ROUTE REQUEST

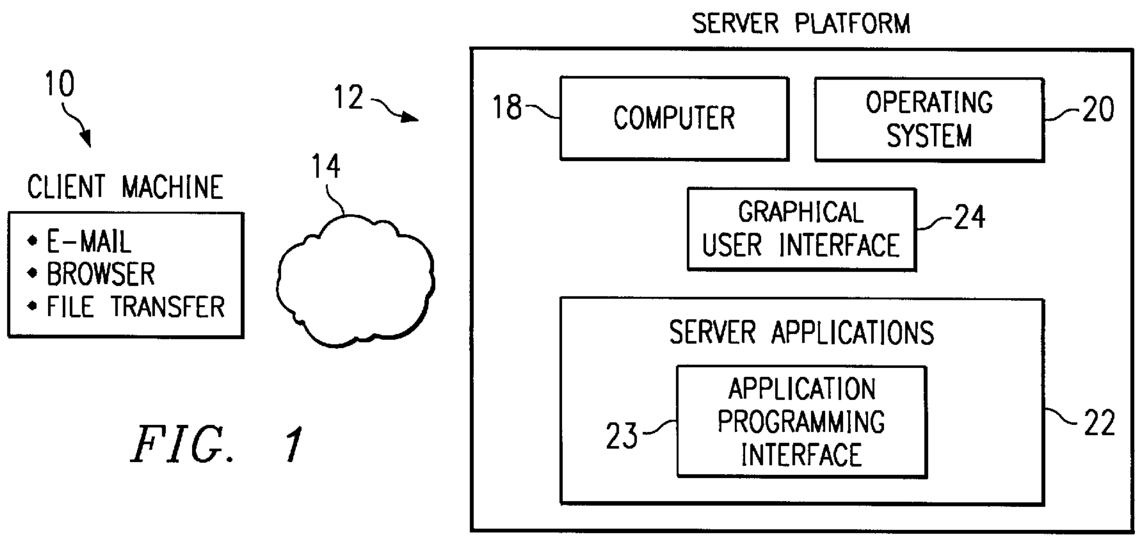
*FIG. 1*
*FIG. 2*
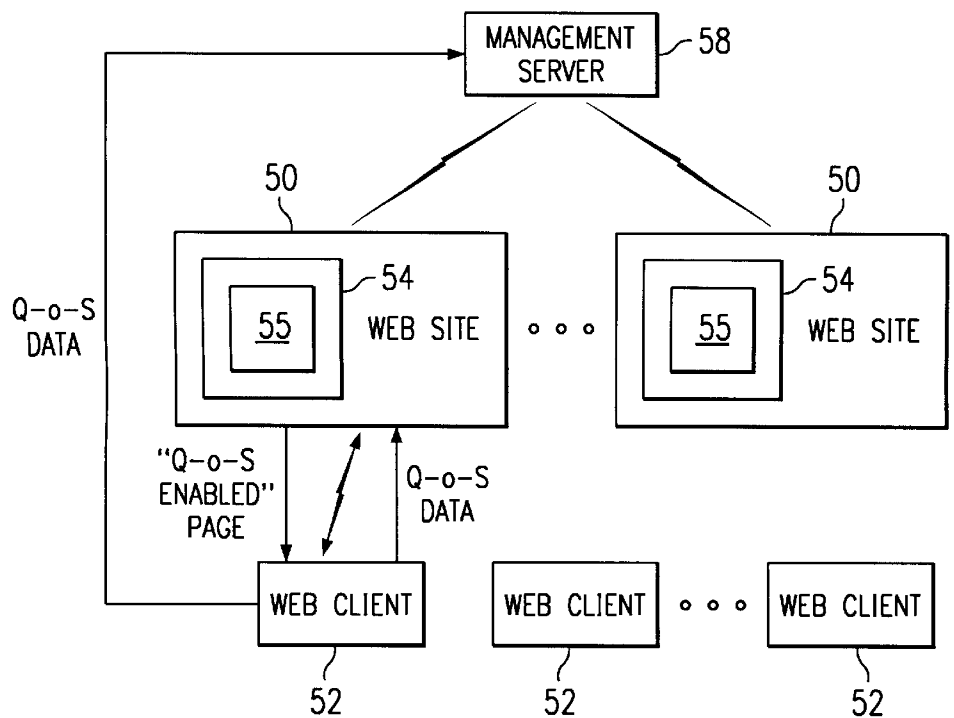

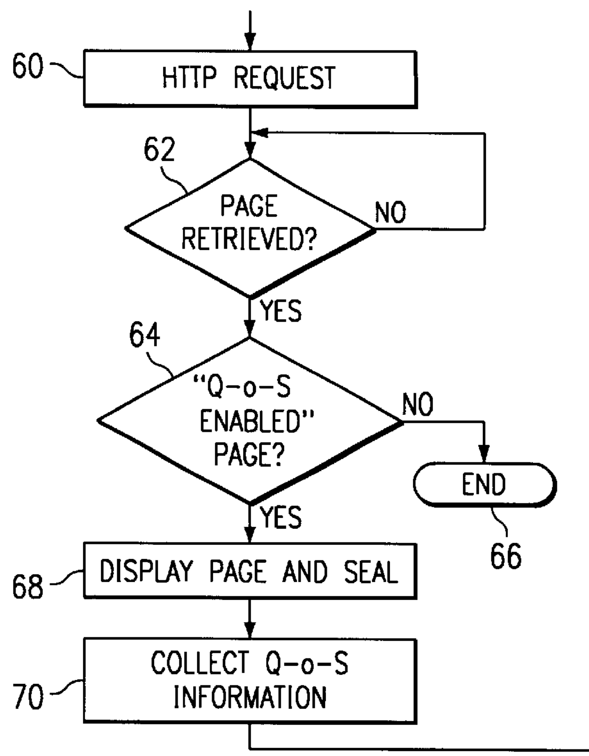
FIG. 3
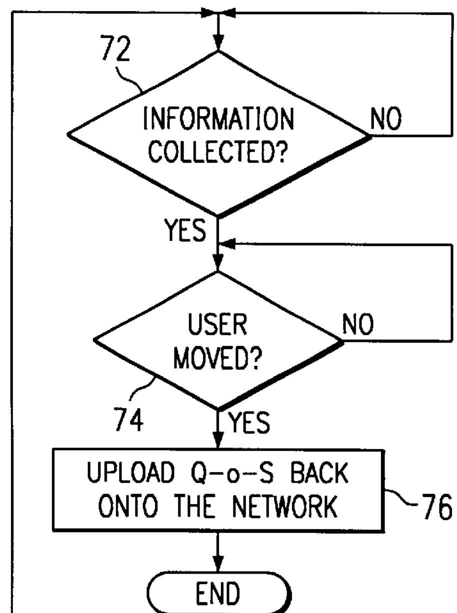
FIG. 4
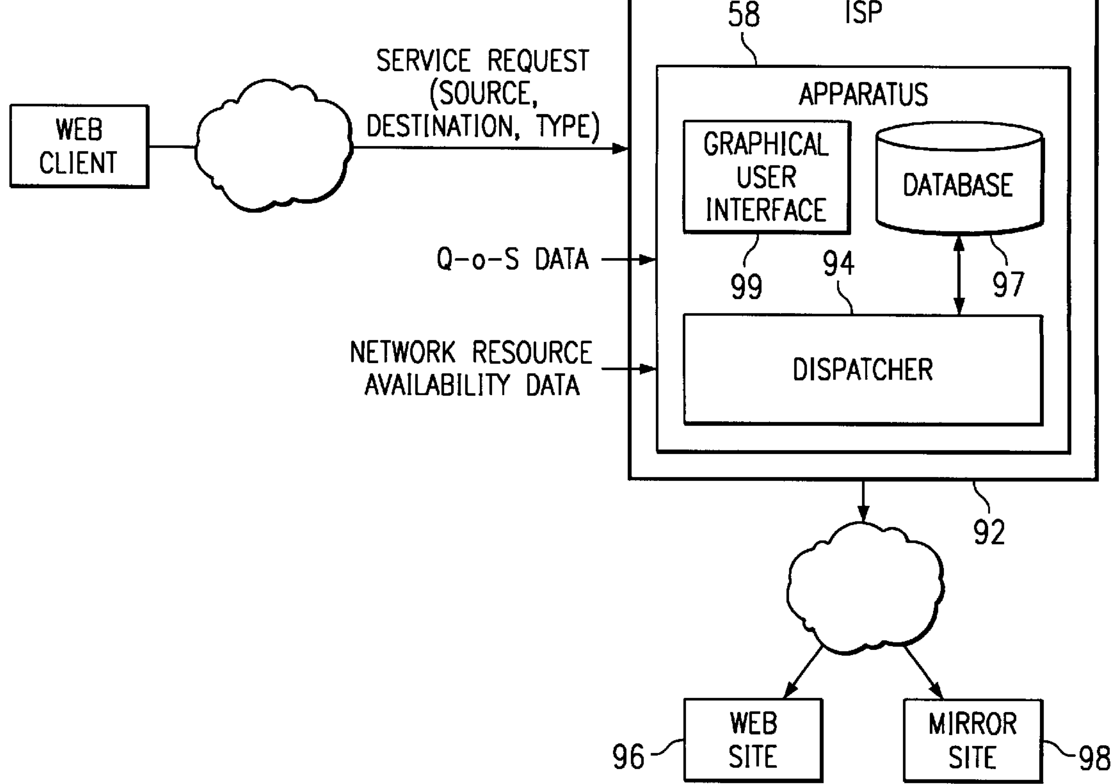

SERVICE REQUEST ROUTING USING QUALITY-OF-SERVICE DATA AND NETWORK RESOURCE INFORMATION

BACKGROUND OF THE INVENTION

1. Technical Field

The present invention relates generally to computer networks and more particularly to using quality-of-service (Q-o-S) and other network resource information to facilitate routing of service requests in a client-server network such as the Internet.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Web site operators desire to monitor the quality-of-service they provide to Web clients in order to attempt to rectify, to the extent practicable, any identifiable service problems. To this end, various Q-o-S monitoring solutions have been proposed and some have been implemented, with mixed results. One approach is to place dedicated monitors or machines at a selected plurality (e.g., 30–40) Internet Service Provider (ISP) or other locations throughout the Internet and to collect various types of usage statistics that are then sold or distributed back to Web site operators interested in such information. The information measured by these monitors, however, may only represent only a small fraction of the total paths used to connect to any given large server. In addition, such monitors are useless for resolving questions about the quality-of-service (e.g., server response times) for requests issued by way of an ISP that is not connected to the set of monitors.

Quality-of-service data is also of interest to Internet Service Providers. Typically, a given Web client may access the Internet through use of a dialup (POTS) connection to an ISP facility. The ISP normally includes a gateway that allows users to send and receive IP packets to and from the Internet, and this gateway also provides basic routing functionality. Current ISP gateways, however, do not have the capability of capturing, managing and/or using quality-of-service and other dynamically-collected network resource information to facilitate routing of service requests.

This is the problem addressed by the present invention.

SUMMARY OF THE INVENTION

It is thus a primary object of the present invention to control routing or forwarding of a service request (e.g., an HTTP request) in a client-server network environment using one or more types of information including measured quality-of-service information, network resource information, information about the source of the request, information about the destination for the request, or information about the service request type.

It is a further object of this invention to route service requests by testing given routing criteria against measured quality-of-service statistics and/or network "state" data.

It is yet another object of this invention to determine how to route a given service request (e.g., an HTTP request for a Web document) over a portion of the Internet using dynamically-varying quality-of-service and/or network resource availability information, together with service request source and destination information.

A further object of this invention is to manage the collection and use of quality-of-service information in an open computer network environment to facilitate forwarding of service requests throughout the network.

It is still another more specific object of this invention to control routing of Web service requests based, in part, on Q-o-S information compiled from Internet clients.

Yet another object of this invention it to provide a given service level within a computer network by establishing and maintaining routing policies to which "dynamic" quality-of-service and/or other network resource information may then be applied to route service requests.

According to the present invention, an apparatus (e.g., a proxy server) for providing such operation as described above is advantageously located at an outbound "edge" of an administrative domain or at an inbound "edge" of an ISP or other network facility. The apparatus includes a dispatching mechanism or "dispatcher." The dispatcher has a database associated therewith in which information about a "current state" of the network or some resource therein is collected and maintained. The "current state" information is generally of two types: quality-of-service (Q-o-S) information associated with transactions involving a particular Web server, or more general network resource availability information. Examples of the former include, without limitation, information about one or more "exception events" associated with Web server transactions such as a broken hypertext link, the end-to-end server response time exceeding some predetermined value, an Internet delay (i.e., the roundtrip time to service a transaction request excluding the server response time) exceeding some predetermined value, or the like. Examples of network resource availability information include, without limitation, network "exception events" such as a router outage notification, a notification that a particular router ha a load exceeding some threshold, a network bottleneck notification, or the like. According to the invention, a routing "policy" is defined at the dispatcher using a set of one or more routing rules. A particular routing policy may also take into consideration the particular source or destination for the service request, or the type of service request, in formulating how the request is to be forwarded.

As service requests arrive at the apparatus, at least one of the requests is routed to a destination using the current state information and the routing policy. Where the service request is routed may also depend on the source of the request, the destination for the request, or the particular type of service request. Generalizing, a Web-based routing method begins by establishing a routing policy including at least one routing rule. Quality-of-service information associated with one or more Web servers is being periodically collected. Network state information is being periodically received from other available sources. In response to a new HTTP service request, the quality-of-service information and/or other network state information is applied to the routing policy to determine how to route the service request.

In a preferred embodiment, at least one routing rule of the routing policy includes a condition and an action. The condition preferably defines one or more "state" events or conditions, and the action preferably defines some form of routing information. As a given service request is received at the apparatus, the condition portion of each routing rule is evaluated using the then-current state information (which changes dynamically as a function of relevant Q-o-S or network resource availability variations). If the condition portion of an applicable routing rule is met, the action (as defined in the rule) is taken. The routing rule (or some portion thereof) may be selectively modified by an administrator as needed to maintain a given service level.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative system in which the present invention is implemented;

FIG. 2 is a block diagram of a quality-of-service monitoring system useful in the present invention;

FIG. 3 is a flowchart illustrating a simplified method of evaluating the quality-of-service associated with a Q-o-S enabled Web page;

FIG. 4 is a block diagram of an Internet Service Provider (ISP) facility that includes a dispatcher for use in routing inbound service requests based on Q-o-S and/or other network resource information according to the present invention;

DETAILED DESCRIPTION OF THE PREFERRED EMBODIMENT

Figure 5:
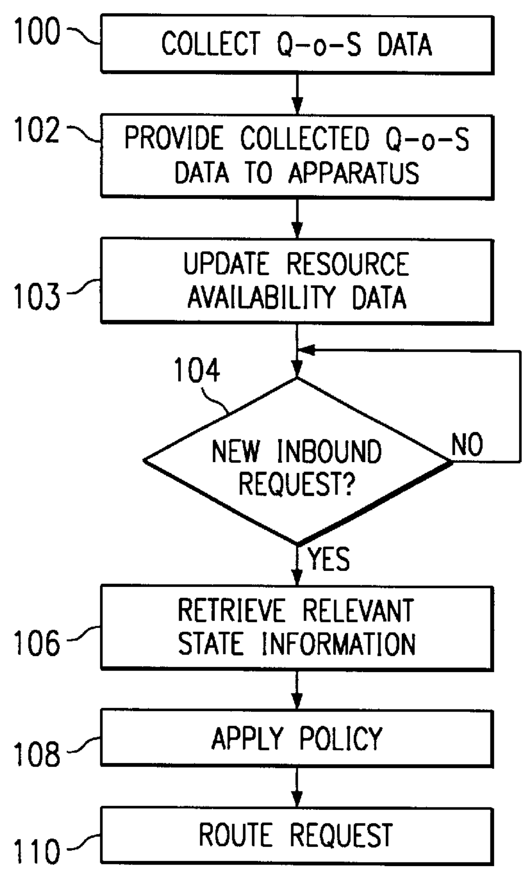
FIG. 5 is a flowchart illustrating a preferred method of routing an inbound service request using the dispatcher shown in FIG. 4.

A representative system in which the present invention is implemented is illustrated in FIG. 1. A client machine 10 is connected to a Web server platform 12 via a computer network 14. For illustrative purposes, network 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. The Web server platform (sometimes referred to as a "Web" site) supports files in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins. As is well-known, the Web server accepts a client request and returns a response. The operation of the server program 22 is governed by a number of server application functions (SAFs), each of which is configured to execute in a certain step of a sequence.

As a background to the present invention, Web sites obtain quality-of-service (Q-o-S) information about the service they provide to Web clients. As will be seen, such Q-o-S is then used (together with other network resource information) to route service requests. By way of brief background, and as described in copending application Ser. No. 08/970,411, filed Nov. 14, 1997, titled "INTERNET QUALITY-OF-SERVICE METHOD AND SYSTEM," now U.S. Pat. No. 6,021,439, issued Feb. 1, 2000, one preferred system for implementing quality-of-service monitoring is illustrated in the block diagram of FIG. 2. Other techniques may be used to develop the Q-o-S information.

The representative system includes at least one Web site 50 that desires to obtain quality-of-service information about its operations. For convenience, such a Web site is sometimes referred to as an "instrumented" Web server or site. A particular Web site 50 may subscribe to the service provided by the system by paying a fee. The system also includes at least one Web client 52 that (as will be described) has the capability of collecting the quality-of-service information. A client having such capability is sometimes referred to herein as an "instrumented" Web client.

As is also illustrated in FIG. 2, a particular Web page 54 supported on the instrumented Web site 50 is identified as a page which the quality-of-service information is collected. Such a page is referred to as an "Q-o-S enabled" page. A Q-o-S enabled page includes a token 55 (which may be an embedded markup tag, or the like) that serves several purposes. First, the token identifies the page to the Web client as a "Q-o-S enabled" page. This token, in effect, identifies the Web site's intent or desire to collect some statistics about the nature of its quality-of-service. The token itself may also function as an "identifier" that is displayed, preferably together with the Web page, so that the user is thus made aware that such quality-of-service statistics are being collected. In this way, the identifier may come to represent a "seal", certification or guarantee that the Web site operator is one that is concerned with and is attempting to address service problems that are experienced by the instrumented Web client.

Thus, a user of the 52 instrumented Web client is preferably notified that a given page is "Q-o-S enabled" by the display (e.g., in the form of a graphic element or text) of information that indicates that the Q-o-S statistics will be or are being collected with respect to that page. The Q-o-S statistics are preferably collected anonymously, i.e. without revealing the user's identity, clickstream or other personal information.

Referring back to FIG. 2, the system may also include one or more management servers 58 to which one or more instrumented Web servers 52 connect to obtain the service. A management server 58 collects Q-o-S information on behalf of multiple Web servers that subscribe to the service. The use of a management server is advantageous because, by their very nature, quality-of-service problems may indicate some core problem with the operations of the instrumented server itself. That problem may inhibit the Web server from obtaining the Q-o-S information directly from the instrumented Web client. Thus, by using the management server 58 to store and maintain the Q-o-S statistics (for one or more instrumented Web servers), and to deliver "outage" or other like requests to the affected server, the Q-o-S information can be provided in a persistent manner. Moreover, the management server enables the system to be easily-scaled and centrally-managed. It also facilitates control over service request routing as will be discussed below.

A simplified flowchart of a method of collecting the quality-of-service information associated with the instrumented Web server is illustrated in FIG. 3. This processing takes place at the client. As noted above, the Web server includes a Web page having a token declaring that quality-of-service information is to be collected. The method begins at step 60 in response to an HTTP GET, POST (or other similar) request. At step 62, a test is performed to determine whether the requested page has been downloaded. If the outcome of the test at step 62 is negative, the routine cycles and waits for the page. If the outcome of the test at step 62 is positive, the routine continues at step 64 by testing whether the downloaded page is "Q-o-S enabled." Typically, step 64 involves parsing the received HTML stream comprising the document and searching for the token. The token may be encoded or encrypted in any known fashion. If the received page is not Q-o-S enabled, the routine branches to step 66 and terminates. In such event, the page is displayed by the browser in the usual way and no Q-o-S statistics are collected.

If, however, the outcome of the test at step 64 indicates that the received page is "Q-o-S enabled," the routine continues at step 68 to display the page, together with an appropriate identifier. The routine then continues at step 70 to collect the quality-of-service information. It should be appreciated that collection of the Q-o-S information may have, in effect, already begin when the page was first requested or upon receipt of the first packet of the requested page, as the logic shown in the flowchart is merely illustrative and the particular Q-o-S metric will determine how and when the data is actually collected. Typically, such collection is effected as a background process. At step 72, a test is done to determine if the Q-o-S information has been collected. Again, the outcome of this test will depend on the type of Q-o-S metric. If the data collection is not finished, the routine cycles. If, however, the outcome of the test at step 72 is positive, the routine continues.

At step 74, a test is performed to determine whether the user has taken a predetermined action (e.g., closed the browser, or navigated to a new page). If the outcome of the test at step 74 is negative, the routine cycles. If, however, the outcome of the test at step 74 indicates that the user has taken the predetermined action, the routine continues at step 76 with the Web client transferring the collected information. If the information is actually collected at the client, step 76 involves uploading the information back onto the network. Preferably, the collected quality-of-service information is uploaded without any information identifying the user. This ends the client-side processing.

The particular quality-of-service information may be quite varied. Typically, however, the information includes one or more "exception" events such as a broken hypertext link, a server response time exceeding some threshold value, an Internet delay exceeding some predetermined value, or the like. The Q-o-S functionality may be built into the browser directly, or it may be provided via a plug-in, a standalone Java application or a network-loaded Java applet. A preferred implementation is provided through the browser application programming interface (API).

Certain quality-of-service information, for example, server response time, Internet delay, and the like, is quite useful for identifying service level problems in a given portion of a network. Such information, generally speaking, is server-specific. Other types of information about the various operating characteristics are also available. Such information generally relates to or describes network resource availability as "exception events." Examples of such network resource availability information includes a router outage notification, a network bottleneck, and the like. According to the present is invention, Q-o-S and/or network resource availability information (collectively, so-called "current state" information) is used to route service requests.

In addition, a particular routing decision may be based in part on where the service request originates, the service request target, and/or the service request type.

Thus, for example, and as illustrated in FIG. 4, a given Web client 90 may access the Internet through use of a dialup (POTS) SLIP/PPP connection to an Internet Service Provider (ISP) facility 92. The ISP typically includes an Internet gateway that allows users to send and receive IP packets to and from the Internet, and this component performs ancillary functions such as routing and IP address assignment. According to a feature of the present invention, ISP 92 also includes a dispatcher 94 that facilitates the routing function based on (1) the collected Q-o-S information and/or (2) other network resource availability information, and, more preferably, exception events associated with one or both types of current state information. In addition, a given routing decision (as implemented in the policy) may depend as well on the service request source, destination or type.

Without meaning to be limiting, the Q-o-S information may be collected as described above in the flowchart of FIG. 3. The network resource information is usually available from broadcast sources within the network, possibly for a service fee. Thus, in this embodiment, the ISP includes the associated server (described above) 58 which maintains the Q-o-S information received as users of Web clients (one of which is client 90) view the Q-o-S enabled pages. Management server 58 may also receive current network resource information from other available network sources. The dispatcher 94 is typically provisioned as part of the server functionality, although this is not a requirement of the present invention.

Referring to FIG. 4, for illustrative purposes it is also assumed that a given Web site 96 has an associated "mirror" site 98. As is known in the art, Web site operators may desire to maintain a duplicate server (the so-called "mirror site" on which the content of the primary server is supported. This provides redundant service so that the content remains available for access irrespective of operational problems or excessive loading on the primary server.

According to the present invention, the dispatcher 94 is provided (preferably on a periodic, substantially continuous or continuous basis) with both Q-o-S information (about the primary site 96 and its mirror site 98) as well as the network resource information. Such information is stored in a database 97. As noted above, preferably the Q-o-S information is collected using Q-o-S enabled pages, although other techniques may be used for this purpose as well. The current state information is received from available sources. The dispatcher includes a policy manager that supports a set of one or more rules in the database 97. The one or more rules comprise a decision algorithm that facilitates routing of inbound service requests (to the ISP) based on then-existing quality-of-service information of relevant system resources and/or other network state information. A given rule may also depend on the service request source, target and/or type.

A flowchart describing an exemplary operation is shown in FIG. 5.

The routine begins at step 100 with the collection of the Q-o-S information over some given period of time. It is assumed that both Web servers 96 and 98 are providing Q-o-S enabled pages. At step 102, the Q-o-S information (derived from Web client users as previously described) is provided at the management server 58 associated with (or located at) the ISP 92. Steps 100 and 102 show these two processes in sequence (with a batch transfer of the Q-o-S data), but one of ordinary skill in the art will appreciate that the Q-o-S information may be provided to the server on a substantially continuous basis with the Q-o-S data being continually updated at the server. At step 103, the server receives other available information about general network resources. This step is optional. At step 104, a test is made to determine whether a new inbound service request is being received at the ISP 92. Inbound service request (for purposes of this example) is an HTTP GET request that seeks to pull a Web document located on Web server 96 or on its associated mirror site 98. Service request has an associated source, destination and/or type (e.g., each of which may be considered a given "service request characteristic"). Thus inbound service request could be processed by either Web server 96 or 98. The decision as to which server to use is then driven by the quality-of-service, network state information and/or the given service request characteristic as applied to the decision algorithm in the dispatcher. In this sense, the routing policy is considered to be "constrained" by the information (Q-o-S data and/or other network resource information) about the current state of the computer network and its resources.

In particular, if the outcome of the test at step 104 is negative, the routine cycles and waits for a next request (for the Web server). If, however, the outcome of the test at step 104 is positive (which indicates that an inbound service request to the Web server is received and must now be routed), the routine continues at step 106 to retrieve relevant Q-o-S and/or network resource information from the database 97. At step 108, the retrieved Q-o-S and/or network resource information is applied to the routing policy supported by the decision manager 95. At step 110, the inbound service request is routed to the appropriate server 96 or 98 depending on the then-existing Q-o-S being experienced by those servers and/or other network state information as applied to the routing policy.

Thus, according to an important advantage of the present invention, an ISP sets up a routing policy for controlling the dispatching of inbound service requests based on Q-o-S information, other network state information being received on a dynamic basis, and/or a given service request characteristic. In the preferred embodiment, a given routing decision is based on all three (3) types of information. As compared to the Q-o-S and state information, the routing policy comprises a relatively "static" set of one or more rules that govern the routing decision based on the dynamically-varying Q-o-S and/or network resource information.

It is envisioned that the ISP operator may alter the routing policy (using a simple administrative interface such as a text editor or GUI 99) as it sees fit to do so based on network or other operational demands. Continuing with the example described above (involving the primary server and its mirror site), the routing policy may simply include a rule that says "favor the primary server over the mirror unless the Q-o-S from the primary server falls below a given threshold" or the like. (The syntax of this rule is merely exemplary, and any appropriate semantic may be used). Thus, for example, the given threshold may be a one (1) second page download time (as experienced by users of Q-o-S enabled pages). Another rule (based only on network resource availability data) may dictate that the dispatcher "favor the primary server over the mirror server unless router A is subject to an outage notification." A more complex rule might involve both Q-o-S and network resource availability information: "favor the primary server over the mirror server unless either (a) there is a network bottleneck at point x or (b) primary server's quality-of-service metric falls below y %." As also noted, the given rule(s) may also take the service request characteristic(s) into effect in determining how the request is to be forwarded.

Generalizing, it can be seen that at least one routing rule of the routing policy includes a condition and an action. The condition preferably defines one or more "state" events or conditions, and the action preferably defines some form of routing information. As a given service request is received at the proxy, the condition portion of each routing rule is evaluated using the then-current state information (which, of course, changes dynamically as a function of relevant Q-o-S or network resource availability variations). If the condition portion of an applicable routing rule is met, the action (as defined in the rule) is taken. One or more routing rules thus become "constrained" by the then-current network state information to determine how a particular (new) service request is routed. The routing rule may be modified by an administrator as necessary to establish, maintain or obtain a given service level metric with respect to a given network resource or path.

Thus, according to the present invention, the Q-o-S information is collected and used (alone or with other network-supplied resource information) on a dynamic basis to improve the level of service in the part of the network provided by the ISP. If, for example, the ISP determines that a particular server is slow (e.g., based on its receipt of a large number of service requests), the ISP can modify the routing policy to effectively allocate more resources to the server to assure that a certain level of service is maintained.

Figure 6:
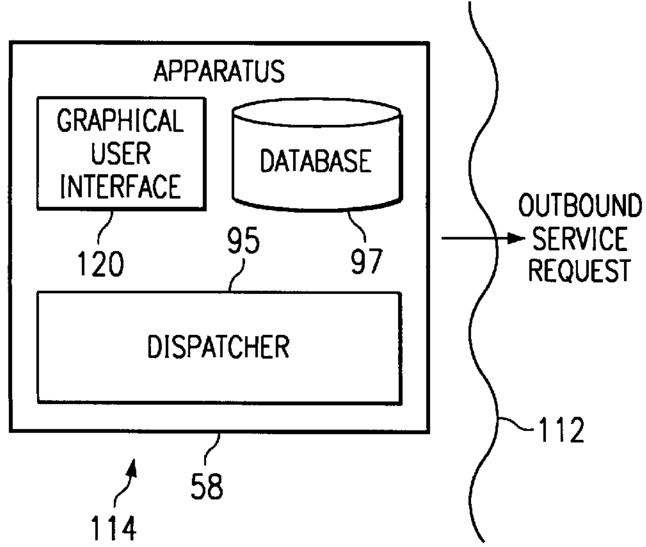
FIG. 6 is a block diagram showing an implementation of the dispatcher mechanism within a proxy located at an edge of an administrative domain to facilitate routing of an outbound service request to one or a selected routes.

The dispatching mechanism is also quite useful in other network routing locations. In particular, and with reference to FIG. 6, the dispatcher mechanism 95 is located within the apparatus 58 at an edge 112 of an administrative domain 114 connectable to the rest of the Internet. As used herein, the "edge" of the administrative domain is that portion just within a network firewall (although this particular location should not be taken to be limiting). Service requests destined for the network at large pass through the apparatus 58 and thus the dispatcher 95. It is assumed (for purposes of illustration only) that a particular outbound service request may be routed to a target destination 115 via a primary route (via ISP1 116) or through an alternative or "secondary" route (via ISP2 118). According to the present invention, apparatus 58 maintains appropriate Q-o-S information about the ISPs in its database 97. It may also support network state information. As has been previously described, the dispatcher implements a routing policy comprising one or more rules. These rules may be predefined or periodically changed, for example, by a network administrator using a text editor or GUI 120. The particular routing policy is then used, together with the quality-of-service and/or network resource availability information, to route outbound service requests to the target server 115 via some optimum or optimal route, or to otherwise maintain a given service level. An example of this operation is now described.

Figure 7:
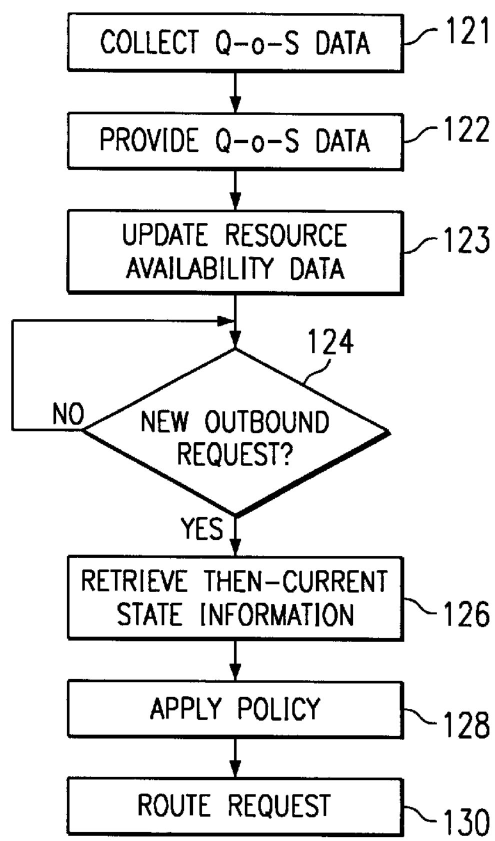
FIG. 7 is a flowchart illustrating a preferred method of routing an outbound service request using the dispatcher shown in FIG. 6.

In particular, FIG. 7 is a flowchart illustrating a preferred method of routing an outbound service request to one of the particular ISPs 116 or 118 using the dispatcher 95 and the collected Q-o-S and/or other network state information that is relevant to this routing decision. The routine begins at step 121 with the collection of the Q-o-S information over some given period of time. As noted above, preferably the Q-o-S information s collected using Q-o-S enabled Web pages, as has been previously described. At step 122, the Q-o-S information is provided to the apparatus 58 within the administrative domain 114. Steps 121 and 122 show these two processes in sequence (with a batch transfer of the Q-o-S data), but one of ordinary skill in the art will appreciate that the Q-o-S information may be provided to the proxy server on a substantially continuous basis. At step 123, the apparatus receives other network state information. At step 124, a test is made to determine whether an outbound service request is being received at the administrative domain. An outbound service request (for purposes of this example) is an HTTP GET request that seeks to pull a Web document located on the target Web server 115. Thus, outbound service request could be routed by either ISP1 116 or ISP2 118. The decision as to which ISP to use is then driven by the Q-o-S information and/or other network resource information as applied to the decision algorithm in the dispatcher. The service request characteristic(s) may also be used for this purpose as well. In a preferred approach, all three (3) types of information are used.

In particular, if the outcome of the test at step 124 is negative, the routine cycles and waits for a next outbound request. If, however, the outcome of the test at step 124 is positive (which indicates that an outbound service request is received and must now be routed), the routine continues at step 126 to retrieve the then-existing Q-o-S information and the resource availability information (each of which that may be relevant) from the database 97. At step 128, the retrieved information is applied to the routing policy supported by the dispatcher. As noted above, this step constrains a particular routing rule using the current state information to thereby derive routing information for the particular request. At step 130, the outbound service request is routed to the appropriate ISP 116 or 118 depending on the then-existing quality-of-service and/or other network state information.

The illustrative "inbound" and "outbound" service request routing examples shown in the above diagrams and flowcharts should not be taken by way of limitation. These examples merely illustrate a preferred use of the Q-o-S information and/or network resource information by the dispatcher. According to the present invention, the dispatcher supports a decision algorithm defined by a set of one or more rules. The Q-o-S information and/or the network resource information are input(s) to the rule engine, with the output of the engine being a routing decision. The routing decision is typically in the form of routing information that is appended to a given HTTP request in a known manner.

The present invention provides a degree of service level management that could not be obtained previously using conventional routing techniques (either at the ISP or the administrative domain, as the case may be). The dispatcher supports a decision policy that determines how inbound or outbound service requests are altered based on dynamically-varying Q-o-S and other information about relevant network devices and systems that are required to service that request. The invention facilitates a much finer degree of routing control that takes into consideration the actual quality-of-service being provided in or across the network, or by particular resources (e.g., routers and the like) in the network. The Q-o-S information is preferably collected from Q-o-S enabled pages (but this is not required), to facilitate a service level management system that protects user privacy and enhances the user's actual and perceived service. The network state information may be received (by the proxy) from any available network source. Such information is often available by broadcast or subscription. Although in the preferred embodiment, both types of information are used to facilitate the routing policy, a particular routing rule may use either type of information. As noted above, the service request characteristic(s) may also be used to determine how the request is forwarded.

Further, instead of collecting and maintaining the state data persistently at the apparatus, it may be desired to obtain the current state information (from the network or some other source) only as needed, e.g. as given service requests are actually received at the apparatus.

Thus, the present invention is implemented (depending on whether inbound or outbound routing is required) either as an apparatus located at or adjacent the edge of an administrative domain of a network (to Control outbound routing) or as an apparatus associated with an Internet Service Provider (ISP) or other such network facility (to control inbound routing). The term "apparatus" should be broadly construed to mean any suitable implementation of a staging element or component (e.g., a software-based engine) that performs the desired functionality described. As noted above, this includes the dispatcher function.

In the former case, the dispatcher preferably routes an HTTP request to one of a given set of service provider paths (and thus one of a given set of service providers such as ISP1, ISP2, etc.). In the latter case, the dispatcher preferably routes an incoming HTTP request to one of a set of servers (e.g., a primary and a mirror site) that may service the request. In either case, the routing decision is based on the current state information.

One of the preferred implementations of the apparatus (including, without limitation, the dispatcher functionality) is as a set of instructions (program code) in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims.

What is claimed is:

1. A method of routing in a computer network, comprising the steps of:

establishing a routing policy including at least one routing rule having a condition and an action;

responsive to a given service request having a given service request characteristic, evaluating the condition in the routing rule against information about a current state of the computer network, wherein a portion of the information about a current state of the computer network is quality-of-service information that has been collected by a client in response to receiving from a server an object that contains a token indicating that quality-of-service information is to be collected by the client; and routing the given service request according to the action if the condition is met.

2. The method as described in claim 1 wherein the service request is routed along one of a given set of network paths as determined by the routing policy in order to maintain a given service level in the computer network.

3. The method as described in claim 1 wherein the service request is routed to one of a given set of servers as determined by the routing policy in order to maintain a given service level in the computer network.

4. The method as described in claim 1 wherein the object is a document containing markup language.

5. The method as described in claim 4 wherein the quality-of-service information is uploaded to another server different from the server from which the object was received.

6. The method as described in claim 1 wherein the information about a current state of the computer network comprises network resource availability information.

7. The method as described in claim 6 further including the step of receiving the network resource availability information from a broadcast source.

8. The method as described in claim 1 further including the step of modifying the routing policy to maintain a given service level in the computer network.

9. The method as described in claim 8 wherein the computer system is the Internet.

10. The method as described in claim 9 wherein the service request is an HTTP request to pull a Web document from a Web server.

11. A computer program product in a computer-readable medium for routing a service request in a computer network, comprising:

means for establishing a routing policy including at least one routing rule having a condition and an action;

means for continuously receiving and storing information about a current state of the computer network, wherein a portion of the information about a current state of the computer network has been collected by a client that collects quality-of-service information in response to receiving from a server an object that contains a token indicating that quality-of-service information is to be collected by the client; and means, responsive to receipt of a given service request having a given service request characteristic, for evaluating the condition in the routing rule against the information about the current state of the computer network and the given service request characteristic.

12. The computer program product as described in claim 11 further including means responsive to the evaluating means for dispatching the given service request according to the action if the condition is met.

13. The computer program product as described in claim 11 wherein the computer network is the Internet and the service request is an HTTP request to pull a Web document from a Web server.

14. The method as described in claim 11 wherein the object is a document containing markup language.

15. The computer program product as described in claim 11 wherein the information about a current state of the computer network comprises network resource availability information.

16. An apparatus located adjacent an edge of an administrative domain connectable to a computer network, comprising:

means for establishing a routing policy including a set of one or more routing rules;

means for receiving and storing information about a current state of the computer network, wherein a portion of the information about a current state of the computer network has been collected by a client that collects quality-of-service information in response to receiving from a server an object that contains a token indicating that quality-of-service information is to be collected by the client; and means, responsive to receipt of a given service request having a given service request characteristic, for evaluating the condition in the routing rule against the information about the current state of the computer network and the given service request characteristic.

17. The apparatus as described in claim 16 further including means responsive to the evaluating means for dispatching the given outbound service request according to the action if the condition is met.

18. The apparatus as described in claim 17 wherein the given outbound service request is dispatched over one of a given set of network paths to maintain a given service level.

19. An apparatus located adjacent an edge of a network service facility connectable to a computer network, comprising:

means for establishing a routing policy including a set of one or more routing rules;

means for receiving and storing information about a current state of the computer network, wherein a portion of the information about a current state of the computer network has been collected by a client that collects quality-of-service information in response to receiving from a server an object that contains a token indicating that quality-of-service information is to be collected by the client; and means, responsive to receipt of a given service request having a given service request characteristic, for evaluating the condition in the routing rule against the information about the current state of the computer network and the given service request characteristic.

20. The apparatus as described in claim 19 further including means responsive to the evaluating means for dispatching the given inbound service request according to the action if the condition is met.

21. The apparatus as described in claim 20 wherein the given inbound service request is dispatched to one of a given set of servers to maintain a given service level.

* * * * *